United States Patent
Carver et al.

(10) Patent No.: US 9,805,869 B2
(45) Date of Patent: Oct. 31, 2017

(54) HIGH ENERGY DENSITY ELECTROSTATIC CAPACITOR

(71) Applicant: Carver Scientific, Inc., Baton Rouge, LA (US)

(72) Inventors: David R. Carver, Baton Rouge, LA (US); Robert G. Carver, Baton Rouge, LA (US); Sean W. Reynolds, Baton Rouge, LA (US)

(73) Assignee: Carver Scientific, Inc., Baton Rouge, LA (US)

( * ) Notice: Subject to any disclaimer, the term of this patent is extended or adjusted under 35 U.S.C. 154(b) by 149 days.

(21) Appl. No.: 14/407,068

(22) PCT Filed: Dec. 31, 2012

(86) PCT No.: PCT/US2012/072337
§ 371 (c)(1),
(2) Date: Dec. 10, 2014

(87) PCT Pub. No.: WO2014/074122
PCT Pub. Date: May 15, 2014

(65) Prior Publication Data
US 2015/0235769 A1    Aug. 20, 2015

Related U.S. Application Data

(63) Continuation of application No. 13/671,546, filed on Nov. 7, 2012, now abandoned.

(51) Int. Cl.
*H01G 4/20* (2006.01)
*H01G 4/18* (2006.01)
(Continued)

(52) U.S. Cl.
CPC .................. *H01G 4/20* (2013.01); *H01G 4/18* (2013.01); *H01G 4/33* (2013.01); *H01G 4/14* (2013.01); *H01G 4/145* (2013.01)

(58) Field of Classification Search
CPC .. H01G 4/20; H01G 4/33; H01G 4/18; H01G 4/14; H01G 4/145
See application file for complete search history.

(56) References Cited

U.S. PATENT DOCUMENTS 2,778,762 A    1/1957    Eisler
2,798,990 A    7/1957    Davis
(Continued)

FOREIGN PATENT DOCUMENTS

EP    1251530 A2    10/2002
EP    1786006 A1    5/2007
(Continued)

OTHER PUBLICATIONS

Extended European Search Report issued for related European Application No. 12888103.4 dated Jun. 9, 2016 (8 pages).
(Continued)

*Primary Examiner* — Nathan Milakovich
(74) *Attorney, Agent, or Firm* — Klarquist Sparkman, LLP

(57) ABSTRACT

A solid state electrical energy state storage device includes multiple dielectric layers or an integral heterogeneous dielectric layer. Layers or portions of the heterogeneous layer have permittivity augmented by exposing the dielectric material to electric/magnetic fields during formation of the dielectric before complete solidification. Such exposure results in radicals and/or an ordered matrix. A dielectric for the device may contain a new xylene based polymer formed under atmospheric conditions via reaction with monatomic oxygen and provided an augmented permittivity through exposure of the polymer to a magnetic field and/or an electric field during condensation and solidification on a substrate.

16 Claims, 4 Drawing Sheets

(51) Int. Cl.
*H01G 4/33* (2006.01)
*H01G 4/14* (2006.01)

(56) References Cited

U.S. PATENT DOCUMENTS

| | | | |
|---|---|---|---|
| 3,288,728 | A | 11/1966 | Gorham |
| 3,342,754 | A | 9/1967 | Gorham |
| 3,616,314 | A | 10/1971 | Settineri et al. |
| 3,907,748 | A | 9/1975 | Marvel et al. |
| 4,333,418 | A | 6/1982 | Nagel et al. |
| 4,359,327 | A | 11/1982 | Armand et al. |
| 4,500,562 | A | 2/1985 | Jahn et al. |
| 4,532,369 | A | 7/1985 | Hartner |
| 4,638,407 | A | 1/1987 | Lundsgaard |
| 4,675,462 | A | 6/1987 | Ungarelli et al. |
| 4,734,533 | A | 3/1988 | Ungarelli et al. |
| 4,748,542 | A | 5/1988 | Lundsgaard |
| 4,769,505 | A | 9/1988 | Lee et al. |
| 4,795,838 | A | 1/1989 | Bornengo et al. |
| 4,806,702 | A | 2/1989 | Lee et al. |
| 4,816,608 | A | 3/1989 | Bornengo et al. |
| 4,849,559 | A | 7/1989 | Lee et al. |
| 4,853,488 | A | 8/1989 | Ungarelli et al. |
| 4,886,923 | A | 12/1989 | Ungarelli et al. |
| 4,942,061 | A | 7/1990 | Domes |
| 4,963,429 | A | 10/1990 | Norian |
| 5,079,674 | A | 1/1992 | Malaspina |
| 5,110,903 | A | 5/1992 | Lee et al. |
| 5,144,529 | A | 9/1992 | Takahashi |
| 5,266,291 | A | 11/1993 | Drnevich et al. |
| 5,305,178 | A | 4/1994 | Binder et al. |
| 5,636,100 | A | 6/1997 | Zheng et al. |
| 5,783,933 | A | 7/1998 | Bailly |
| 6,096,234 | A | 8/2000 | Nakanishi |
| 6,307,735 | B1 | 10/2001 | Saito et al. |
| 6,341,056 | B1* | 1/2002 | Allman ............... H01G 4/20 257/295 |
| 6,602,741 | B1 | 8/2003 | Kudoh |
| 6,674,635 | B1 | 1/2004 | Fife et al. |
| 6,977,025 | B2* | 12/2005 | McArdle ............. G03F 7/34 156/247 |
| 7,033,406 | B2 | 4/2006 | Weir et al. |
| 7,164,197 | B2 | 1/2007 | Mao et al. |
| 7,170,260 | B2 | 1/2007 | Thrap |
| 7,190,016 | B2 | 3/2007 | Cahalen et al. |
| 7,279,777 | B2 | 10/2007 | Bai et al. |
| 7,342,755 | B1 | 3/2008 | Horvat et al. |
| 7,413,815 | B2* | 8/2008 | Pramanik ........... B32B 15/08 257/E23.062 |
| 7,429,317 | B2 | 9/2008 | Paul |
| 7,495,887 | B2 | 2/2009 | Cox |
| 7,542,265 | B2 | 6/2009 | Tan et al. |
| 7,781,358 | B2 | 8/2010 | Hackenberger et al. |
| 8,164,881 | B2 | 4/2012 | Hu et al. |
| 8,289,676 | B2 | 10/2012 | Giannantonio et al. |
| 8,382,042 | B2 | 2/2013 | Sanderson et al. |
| 8,432,663 | B2 | 4/2013 | Carver |
| 8,611,068 | B2* | 12/2013 | Baer ............... B29C 47/0021 361/313 |
| 8,633,289 | B2 | 1/2014 | Carver et al. |
| 8,940,850 | B2 | 1/2015 | Carver et al. |
| 9,011,627 | B2 | 4/2015 | Carver et al. |
| 9,087,645 | B2 | 7/2015 | Holme et al. |
| 2004/0210289 | A1 | 10/2004 | Wang et al. |
| 2006/0034035 | A1 | 2/2006 | Maruo |
| 2006/0065045 | A1 | 3/2006 | Borwick et al. |
| 2006/0074164 | A1 | 4/2006 | Slenes et al. |
| 2006/0182973 | A1 | 7/2006 | Lee et al. |
| 2006/0191443 | A1 | 8/2006 | Yamaguchi et al. |
| 2007/0108490 | A1 | 5/2007 | Tan et al. |
| 2007/0117886 | A1 | 5/2007 | Tan et al. |
| 2008/0171230 | A1 | 7/2008 | Zou et al. |
| 2008/0180876 | A1 | 7/2008 | Shimanouchi et al. |
| 2008/0293864 | A1 | 11/2008 | Tan et al. |
| 2009/0090999 | A1 | 4/2009 | Carver |
| 2009/0312474 | A1 | 12/2009 | Tan et al. |
| 2010/0002362 | A1 | 1/2010 | Clelland et al. |
| 2010/0033899 | A1 | 2/2010 | Koh et al. |
| 2010/0079926 | A1 | 4/2010 | Tan et al. |
| 2010/0172066 | A1 | 7/2010 | Baer et al. |
| 2010/0214719 | A1* | 8/2010 | Kim ............... H01G 4/33 361/313 |
| 2010/0259865 | A1* | 10/2010 | Tan ................. H01G 4/33 361/305 |
| 2010/0302707 | A1 | 12/2010 | Tan et al. |
| 2010/0309607 | A1 | 12/2010 | Liu et al. |
| 2012/0081833 | A1 | 4/2012 | Cao et al. |
| 2012/0127122 | A1 | 5/2012 | Lim |
| 2012/0241085 | A1 | 9/2012 | Carver |
| 2013/0194716 | A1 | 8/2013 | Holme et al. |
| 2013/0224397 | A1 | 8/2013 | Carver |
| 2014/0295101 | A1 | 10/2014 | Carver |
| 2015/0000090 | A1 | 1/2015 | Carver et al. |
| 2015/0000833 | A1 | 1/2015 | Carver et al. |
| 2015/0017342 | A1 | 1/2015 | Carver et al. |
| 2015/0131198 | A1 | 5/2015 | Carver et al. |
| 2015/0131205 | A1 | 5/2015 | Amaratunga et al. |
| 2015/0235768 | A1 | 8/2015 | Holme et al. |

FOREIGN PATENT DOCUMENTS

| | | |
|---|---|---|
| EP | 2 264 727 | 12/2010 |
| JP | 54145000 A | 11/1979 |
| JP | 2007-106875 A | 4/2007 |
| JP | 2010177571 | 8/2010 |
| JP | 2012080099 | 4/2012 |
| WO | WO 2009046341 | 4/2009 |
| WO | WO 2014035456 | 3/2014 |
| WO | WO2014/074122 A2 | 5/2014 |
| WO | WO2014/161007 A2 | 10/2014 |

OTHER PUBLICATIONS

International Search Report issued for related PCT Application No. PCT/US2012/072337, dated Mar. 5, 2013 (3 pages).
Office Action issued for related Japanese Application No. 2015-540650, dated Sep. 6, 2016 (9 pages with English-language translation).
Definition for dielectric materials: http://whatis.techtarget.com/definition/dielectric-material (downloaded Jul. 28, 2014).
Final Office Action from the U.S. Patent and Trademark Office for U.S. Appl. No. 12/245,665 (dated Aug. 15, 2012).
Ihn, et al., "Dielectric Functions of Cd(1-x)Mg(x)Te Alloy Films by Using Spectroscopic Ellipsometry," *Journal of Korean Physical Society* 43(4): 634-637, Oct. 2003.
Ihn et al., Parametric modeling of the dielectric functions of Cd1-xMgxTe alloy films, *Thin Solid Films*, 455-456 (2004) 222-227, May 1, 2004.
International Search Report for PCT/US2014/033102 (dated Oct. 8, 2015).
International Search Report and Written Opinion from International application No. PCT/US2008/078808, dated Feb. 25, 2009.
Jeffrey B. Fortin and Toh-Ming Lu, "Chemical Vapor Deposition Polymerization—The Growth and Properties of Parylene Thin Films," 2004, p. 4-7.
Notification of Reexamination (with English-language translation) from the State Intellectual Property Office of the People's Republic of China for Application. No. CN 200880119265.6, dated Nov. 15, 2014 (19 pages).
Notification of the Decision of Rejection (with English-language translation) from the State Intellectual Property Office of the People's Republic of China for Application. No. CN 200880119265.6, dated Feb. 5, 2013 (20 pages).
Office action (with English-language translation) from the Japanese Patent Office for Application. No. 2010-528177, dated Nov. 19, 2012 (9 pages).
Office Action (with English-language translation) from the State Intellectual Property Office of the People's Republic of China for Application. No. CN 200880119265.6, dated May 11, 2012 (18 pages).

(56) References Cited

OTHER PUBLICATIONS

Office Action from the U.S. Patent and Trademark Office for U.S. Appl. No. 12/245,665 (dated Dec. 7, 2011).
Office Action from the U.S. Patent and Trademark Office for U.S. Appl. No. 13/853,712 (dated Sep. 17, 2014).
Office Action from the U.S. Patent and Trademark Office for U.S. Appl. No. 14/156,457 (dated Aug. 1, 2014).
Office Action from the U.S. Patent and Trademark Office for U.S. Appl. No. 14/490,873 (dated Jan. 15, 2015).
Rolf Gleiter Henning Hopf and John Wiley, "Modern Cyclophane Chemistry," 2004, p. 211-217.
Written Opinion for Singapore Application No. 11201503442V, dated Nov. 16, 2015 (11 pages).

* cited by examiner

HIGH ENERGY DENSITY ELECTROSTATIC CAPACITOR

RELATED APPLICATION

This application is a national stage filing of PCT/US12/72337 filed Dec. 31, 2012, which claims the benefit of priority of U.S. Nonprovisional application Ser. No. 13/671,546 filed Nov. 7, 2012.

FIELD OF THE INVENTION

This invention relates generally to capacitors, and, more particularly, to a high energy density capacitor with a dielectric layer between augmented permittivity polymer layers.

BACKGROUND

Methods for the manufacture of capacitors are varied depending upon the nature of the capacitor and the energy storage requirements. In electronics, low dissipation factor and small size are primary requirements. In other applications the size of the energy storage device is less important than cost. In yet other applications, rapid delivery of the energy stored in the capacitor is a paramount concern.

In the field of energy storage, capacitors are generally recognized as advantageous. In the past, pure electrostatic capacitors have usually been the least energy dense and one of the most expensive devices to store bulk energy. Despite their limitations, electrostatic capacitors have found widespread use in electronics due to their ability to deliver very high power rates. This very attractive feature is due to the ways in which the power is stored within the capacitor. For example, since the discharge of a capacitor does not generally depend upon the movement of electrochemical species in a relatively macro environment, the power delivered by a capacitor is generally at least several orders of magnitude greater than a similarly sized electrochemical battery.

Capacitors are also generally able to withstand relatively low temperatures and relatively high temperatures. Many types of capacitors perform in temperature ranges of $-30°$ C. to $120°$ C. Extension of these ranges with controlled or linear capacitances is also a desirable feature.

Unfortunately, capacitors are also generally characterized by high cost per unit energy stored per volume or weight. Use of electrostatic capacitors for bulk energy storage has been severely hampered by the high unit costs in this application. A reduction in the unit cost per unit energy stored is desperately needed by the world's increasing needs for energy storage.

By way of background, assuming a 1 cubic meter volume and using units of the mks system, it can be shown that energy is proportional to permittivity and inversely proportional to the square of the thickness or distance between electrodes, as follows:

$$U = \frac{e_0 K V^2}{2d^2} = \frac{e_0 K E^2}{2}$$

where, U=energy
V=Voltage between the electrodes
d=distance between electrodes
K=Relative Permittivity
$e_0$=permittivity of vacuum
E=Electric Field (V/d)

The thinnest dielectric at the highest voltage possible (largest E-field) will provide the highest energy density possible at a given relative permittivity, K. The highest voltage possible varies greatly depending upon the material used for the dielectric. To obtain the highest energy storage levels, the dielectric should be very nonconductive, have a good permittivity and be as thin as possible.

Any conductivity between the electrodes is termed leakage current and is to be avoided. At some voltage level the dielectric will become conductive, by either the leakage current rising to unacceptable levels or the leakage current rising dramatically in a fraction of a second (usually accompanied by a plasma spark). The limit of the E-field value varies greatly depending upon the molecular chemical nature of the dielectric and the morphology of the dielectric material.

As a general rule the more polar a molecule in the dielectric, the higher the dielectric constant (i.e., relative permittivity). And, as a general rule the high dielectric breakdown voltage materials tend to have low permittivity. Exceptions to those general rules are certain compounds, such as barium titanate or other Perovskite types of mixed metal oxides (ceramics). Those types of compounds we can see both high permittivity and good resistance to dielectric voltage breakdown. However, another problem then occurs when these types of dielectrics are pushed to energy storage levels that are beyond their capabilities. In particular, metal oxide ceramics have difficulty maintaining high permittivity at large E-fields (voltages). As an example, it has often been found that the permittivity of barium titanate at high E-fields results in an over 100 times reduction in permittivity versus the low E-field permittivity. Thus, the need for a high E-field breakdown material with simultaneous high permittivity is needed in electrostatic capacitor devices. It is therefore important that the voltage rating for the capacitor be as high as possible when energy storage is the primary use for the device.

In addition to having a high break down voltage, a high energy density capacitor should also possess an extremely low leakage current. Thus, when the capacitor has been charged to a given voltage, the rate of charge conduction from one electrode to the other should be a relatively small value. When the capacitor is charged for energy storage over a given period of time, the rate of leakage is an acceptably low enough value that would vary depending on the use of the storage device (how long is it stored) and the "value" of the energy thus stored (how easy is it to recharge and the cost of the charge). While an acceptable value for leakage may vary greatly from application to application, leakage is undesirable and to be avoided and minimized.

Heretofore it has been recognized that the addition of insulative materials to the dielectric matrix can cause an unwanted diminution in the value of the dielectric breakdown strength. In general this is true. Also the construction of a capacitor is governed by the geometric construction of the device. A multilayer dielectric is generally not preferred for a film capacitor. Setting aside the complications involved in forming several layers between the electrodes for the dielectric, the overall gain of energy storage is usually little if any. This is caused by the reduction in the E-field that is necessary when the layers are diminished in thickness.

Due to the desirable characteristics of electrostatic capacitors and other undesirable features, an improvement in the methods and materials for the construction of these energy storage device and improved capacitors incorporating these materials are needed. The invention is directed to overcoming one or more of the problems and solving one or more of the needs as set forth above.

SUMMARY OF THE INVENTION

To solve one or more of the problems set forth above, in an exemplary implementation of the invention, a solid state electrical energy state storage device, such as a capacitor, includes a pair of conductive electrodes, i.e., a first electrode and a second electrode. The first electrode and second electrode are parallel and spaced apart by an intervening space. A primary dielectric comprised of a primary dielectric material is disposed between the pair of conductive electrodes within the intervening space. The primary dielectric has a first surface adjacent to the first electrode and an opposite second surface adjacent to the second electrode. The secondary dielectric layer is comprised of a secondary dielectric material and is disposed between and in contact with the first surface of the primary dielectric and the first electrode. The secondary dielectric layer has an augmented permittivity, i.e., a permittivity that is augmented by exposing the dielectric to a magnetic field and/or an electric field during formation of the dielectric material, before the dielectric material has fully solidified. The tertiary dielectric layer may also have an augmented permittivity. The permittivity and composition of the secondary and/or tertiary dielectric layers may be different from the permittivity of the primary dielectric. The permittivity and composition of the secondary and tertiary dielectric layers may be, but do not have to be, the same. The secondary and tertiary dielectric layers may be thin films having thicknesses that are substantially less than the primary thickness of the primary dielectric. The secondary and tertiary dielectric layers may be comprised of an insulating polymer, such as a xylene based polymer. Further, the xylene based polymer may be a puralene polymer, which is a new xylene based polymer formed under atmospheric conditions via reaction with monatomic oxygen and provided an augmented permittivity through exposure of the polymer to a magnetic field and/or an electric field during condensation and solidification on a substrate. Exposure to an electric field provides an electric field ordered solid matrix. Exposure to a magnetic field induces radical intermediate species and attendant increases in permittivity.

In another embodiment, the solid state electrical energy state storage device includes an integrally formed heterogeneous dielectric disposed between the pair of conductive electrodes. In this embodiment, the dielectric has different compositions (e.g., different concentrations of constituents) through its volume, and different permittivities through its volume.

By way of example, the integrally formed heterogeneous dielectric may have a first portion including a first surface and a first composition, a central portion and a second portion including a second surface opposite the first surface and a second composition. The first surface is adjacent to and in contact with the first electrode. The opposite second surface is adjacent to and in contact with the second electrode. The central portion has a central composition and is disposed between the first portion and the second portion. The central composition has a central average permittivity. The first composition has a first average permittivity. The second composition has a second average permittivity. The first and second average permittivities may be the same augmented permittivity (e.g., electric field and/or magnetic field augmented permittivity) and may be different from the central average permittivity.

BRIEF DESCRIPTION OF THE DRAWINGS

The foregoing and other aspects, objects, features and advantages of the invention will become better understood with reference to the following description, appended claims, and accompanying drawings, where:

Figure 1:
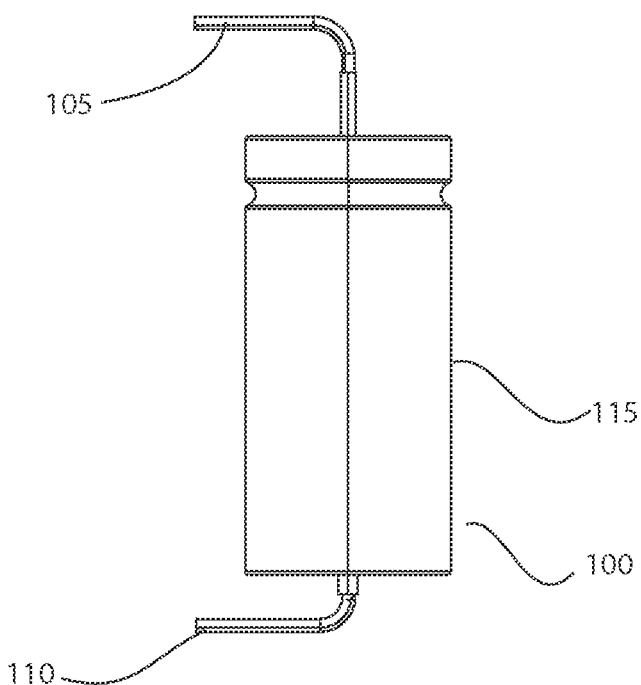
FIG. 1 is a side view of an exemplary capacitor that may contain conductive and dielectric elements according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

In a capacitor with a multilayer dielectric between two electrodes, where each dielectric layer may have distinct relative permittivity, the overall permittivity is the following:

$$\frac{1}{K} = \frac{f_a}{K_a} + \frac{f_b}{K_b} + \frac{f_c}{K_c} \ldots$$

Where K=overall relative permittivity
$f_x$=volume fraction percent of layer x
$K_x$=relative permittivity of layer x The lowest permittivity layer predominates in the calculations to a very large extent when the volume fractions of the layers are relatively equal. However, when the volume fraction percent of the low permittivity material is small and permittivity of the larger bulk layer is large, then the overall permittivity of the device is less substantially compromised by the low permittivity material. This is illustrated in the table below.

TABLE 1

| | | Permittivity (K) of layer a | | |
|---|---|---|---|---|
| | | 3.0 | 6.0 | 12.0 |
| | | Permittivity (K) of layer b | | |
| | | 20000.0 | 20000.0 | 20000.0 |
| $f_a$ | $f_b$ | K | K | K |
| 0.1 | 0.9 | 30.0 | 59.8 | 119.4 |
| 0.2 | 0.8 | 15.0 | 30.0 | 59.9 |

Thus, if the volume fractions are chosen carefully and relative permittivity of the layers is optimized, then vast improvement of the dielectric can take place. Heretofore these improvements have not been realized due to the processes, materials, and the methods defined herein having not been invented.

The aforementioned results are tempered by the ability of the dielectric to withstand substantial E-fields without dielectric breakdown or excessive leakage currents. Thus, the benefit of energy storage improvements in the permittivity can be completely negated by a reduction in the working E-field values.

A common misconception is that the permittivity of a given material is linear to the point of its breakdown voltage. Extreme non-linearity in permittivity is usually found. In certain cases (e.g., barium titanate) the reduction in permittivity can be over 100 times the low field value. Thus, increases in E-field are less productive in traditional capacitor design than thought.

A previously known general class of energy storage devices is referred to as HED (High Energy Density) capacitors. These capacitors are electrostatic capacitors that are different from EDLC (Electrical Double Layer Capacitor) type of capacitors commonly referred to as supercapacitors or ultracapacitors. As the design, manufacture, and performance of the energy storage devices disclosed herein differ in construction, materials, and overall performance so much from previously known devices for energy storage, a new term for these devices is used herein. The acronym SHED (Super High Energy Density) is a name given to a capacitor having a structure and composition according to principles of the invention. SHED capacitors have properties and a design that are most closely related to traditional electrostatic capacitors. Concomitantly, SHED capacitors have performance characteristics that are normally associated with polymer film capacitors, but the energy densities are vastly greater than that of traditional film capacitors by orders of magnitude.

Additionally, in the case of a SHED capacitor, reduced E-fields are present in the bulk dielectric and permittivity is linear with E-field. This enables substantially increased energy storage.

In a preferred embodiment, substantial improvements in the voltage rating, leakage current, and dielectric permittivity of an energy storage capacitor are realized. While the improvements as described herein relate to the field of energy storage, the methods and devices disclosed herein may be applied to other devices, imparting improved frequency response and reduced dielectric absorption.

In one or more embodiments, a high permittivity low leakage capacitor and energy storage device is described having the following improved characteristics:

1) High voltage rating (High break-down E-field),
2) High relative permittivity,
3) Low leakage current at maximum voltage charge,
4) Small size and weight,
5) Safe use due to low toxicity and other hazards,
6) Easy and better manufacturing procedures,
7) Environmentally friendly manufacturing,
8) High rate of discharge and charge, and
9) Ability to fully discharge their electrical energy.

A process for manufacturing high permittivity high quality materials for use in a capacitor according to principles of the invention is also disclosed. Among the materials is a material referred to herein as Puralene, which is a compounds that possess the characteristics of a recognized class of materials known as parylenes. The Puralene class of materials extends into materials comprised of polymeric aromatics possessing carbon atoms alpha to aromatic moieties within the starting materials. Puralenes are one class of materials that can be used to make energy storage devices according to principles of the invention.

The varieties of dielectrics that may be used to form a capacitor are virtually limitless. To produce a substantially improved energy storage device, it requires more than simply making a dielectric and putting it between two electrodes. The method whereby the dielectric is selected, transformed, and applied is important and not obvious to those skilled in the art of electrostatic capacitor manufacture. Additionally, embodiments are described whereby certain known methods of manufacture which are commonly discounted as being unattractive methods of process are shown to be actually superior methods for the production of high energy density electrostatic capacitors.

During manufacture a magnetic or electric field or both may imposed upon the dielectric material, i.e., the dielectric material may be exposed to such fields as part of the manufacturing process. The exposure to an electric or magnetic field during processing results in a different material that exhibits increased permittivity, i.e., augmented permittivity. At low electric field potentials, the increase in permittivity is proportionally increased with the increase in the electric field potential. In some salts of inorganic metal ions the increase in the permittivity is achieved when exposed to a magnetic field. Additionally, exposure to magnetic fields enhances permittivity of organic compounds.

Simultaneous utilization of an electric field and a magnetic field can help reduce the requirements for the strength of either field with materials that respond to the magnetic field. When electric field strengths of almost any magnitude are impressed upon the dielectric, before full solidification, while the dielectric is in a pliable or less viscous state, an increase in the permittivity of the resulting dielectric is achieved. This is made possible using the low temperature processes described herein. Electric field strengths greater than 100 V/micron provide greater than 100% improvement in the permittivities of several different organic and inorganic dielectrics.

Magnetic fields may also be used to cause increases in the permittivities. Even a relatively small magnetic field (e.g., about 1 Gauss) has caused observable increases in the permittivity of polymeric materials and/or crystallization of polymers, small molecule organics, and salts of both inorganic and organic nature. Strong magnetic fields seem to induce greater amounts of permittivity increases than weak fields. Permittivities in the range of 7 to >2000 and improvements in permittivities from normal range from 5% to >6000% have been observed utilizing the methods taught.

In the case of a molecule in which there is substantial polarization and/or separation of charge due to zwitterionic structures, the acid and the base may be contained within the molecule itself. In those cases, high dielectric polarization may be achieved within a single molecule. Good permittivities may be obtained with amino acids where an acid and base chemical moiety is found. However, in many protein matrices, ionic forms may be encapsulated with the protein backbone. In the case of the protein zein, this structure is believed to produce a high permittivity dielectric when solidified under a magnetic and/or electric field.

The following representative embodiments, set forth specific examples of methods of making a high permittivity material in accordance with the present disclosure. It is understood that the disclosure need not be limited to the disclosed embodiments but it is intended to cover various modifications thereof, including combinations of the steps and components of the various examples.

Figure 2:
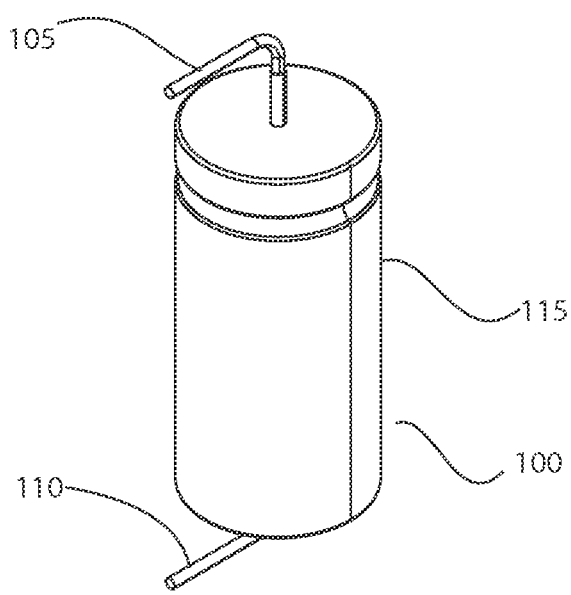
FIG. 2 is a perspective view of an exemplary capacitor that may contain conductive and dielectric elements according to principles of the invention.

Referring now to FIGS. 1 and 2, a conventional form of a capacitor (originally known as condenser) is conceptually illustrated. The capacitor includes housing which contains a dielectric material disposed between a pair of opposed plates, referred to as electrodes. Connecting leads extend from the electrodes. The configuration and arrangement of the housing, connecting leads, plates and dielectric material may have many variations. While the invention may be applied to a capacitor of the type illustrated in FIGS. 1 and 2, the invention is not limited to such a particular capacitor configuration.

Figure 3:
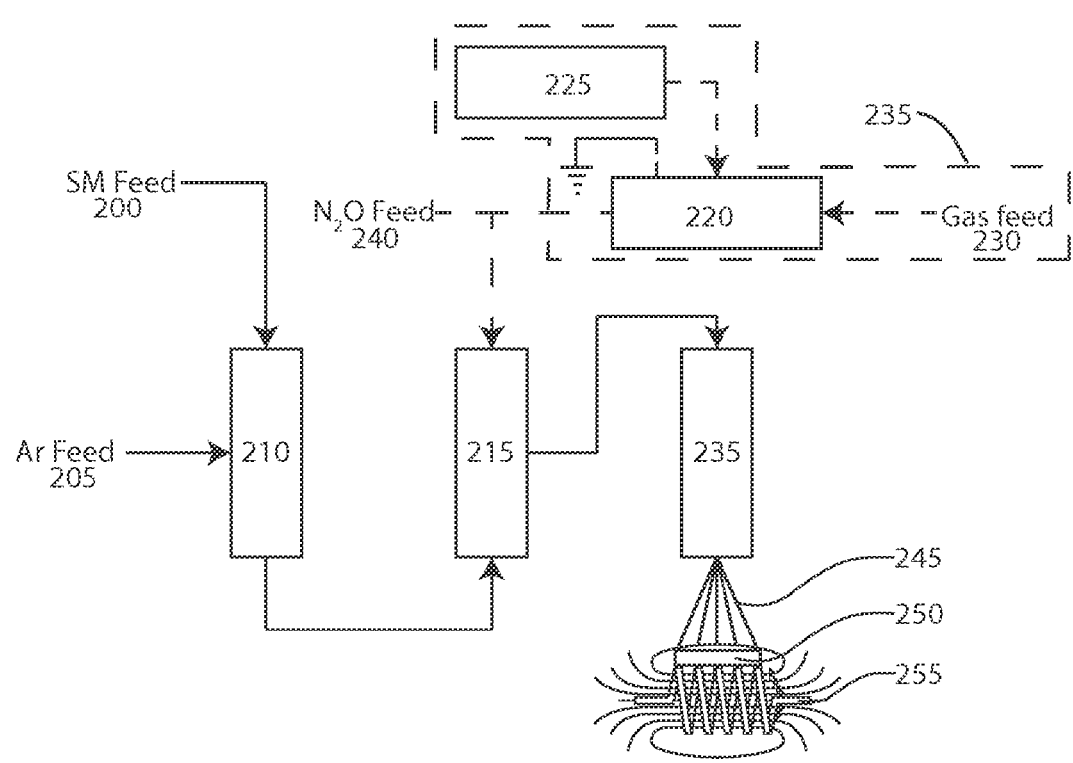
FIG. 3 is a high level flowchart that illustrates an exemplary method of producing an augmented permittivity material for use in a capacitor according to principles of the invention.

Referring now to FIG. 3, a high level flowchart that illustrates an exemplary method of producing an augmented permittivity material, e.g., Puralene, for use in a capacitor according to principles of the invention is shown. Sections, referred to chambers, may comprise tanks having an inlet and an outlet or tubular structures with an inlet and an outlet. Chamber 210 is a heated tube or other evaporation device to volatilize starting material feed 200. Starting material feed 200 is evaporated and mixed with inert gas 205 in chamber 210. Inert gas 205 may be any of a group of inert gases, such as, but not limited to, Argon. Substitution of nitrogen for argon and/or other essentially inert gases is possible. Pumps and valves may be used to propel and control the flow of fluids from one station to another.

By way of example and not limitation, chamber 210 may comprise an electrically heated Inconel (nickel alloy 600) pyrolysis reaction tube. The tube is heated to a temperature of about 450° C. to 630° C. at atmospheric pressure. A flowing stream of argon gas alone, or with a reactive compound such as nitrous oxide, is supplied to the pyrolysis reaction tube. The starter material feed 200 may be xylene vapor (Aldrich #134449-4L). If the carrier gas 205 includes a reactive compound (e.g., $N_2O$), the ratio of gases is adjusted to provide approximately molar stoichiometric ratios of 1:1 (xylene to nitrous oxide).

The heated starter material 200 in the volatile mixture with inert gas reacts with monatomic oxygen in reaction chamber 215. Being very reactive and transient, monatomic oxygen must be available to react with the volatile mixture in the reaction chamber 215. As discussed above, the source of monatomic oxygen may be a gaseous compound supplied with the carrier gas 205, or a gaseous compound supplied separately 240, or another source, such as a plasma generator 235.

Monatomic oxygen plasma may be created by exposing oxygen ($O_2$) gas at a low pressure to a high power energy source, such as an RF discharge, which ionizes the gas. Alternatively, a compound such as Nitrous Oxide ($N_2O$) may supply monatomic oxygen for the reaction. Thus, a monatomic oxygen plasma generator 235, or a monatomic oxygen chemical compound (e.g., $N_2O$) feed 240, or another suitable source of monatomic oxygen is provided.

A plasma gas can be used with the aforementioned starting materials to form the intermediate oxidized products that may subsequently react to form reaction products that are oxidized forms of the starting materials which may be monomers, dimers, trimers, oligomers, or polymers. The plasma generator 235 includes a gas feed 230 that supplies gas to a plasma reaction chamber 220. A plasma driver 225 provides high power energy to ionize the gas.

The ratio of gases is adjusted to provide approximately molar stoichiometric ratios of 1:1 (xylene to nitrous oxide or xylene to monatomic oxygen plasma). Illustratively, increased amounts of nitrous oxide result in partial and/or complete oxidation of xylene with reduced formation of the desired cyclophane or its polymer. Close control of the stoichiometry is desired in this gas phase reaction.

The reaction products are supplied to a reaction chamber 235, which is heated to approximately 450° C. to 800° C. to facilitate vaporization of the reaction products. The vaporized reaction products 245 are expelled onto a low temperature collection surface 250, where the reaction products condense and form a solid. At higher temperatures (650° C. to 800° C.) the output of the reaction chamber 235 is sufficiently hot enough to maintain the monomeric p-xylylene in monomeric form.

Condensation of the gas onto a cooled glass vessel resulted in the deposition of a colorless to cream colored solid. This solid is partially soluble in 95% ethanol. The solid was compared to a sample of [2,2']paracyclophane (Aldrich #P225-5G-A) by GC analysis (SRI#310, 15 m, megabore column, FID detector) and was shown to give identical retention times.

Rapidly cooling of the monomer onto a surface 250 results in a liquid condensation of the monomer and rapid polymerization of the monomer into a polymer. Comparison of the film thus produced appears to be identical to parylene film produced by the Gorham process. Without augmentation, permittivity of the solidified product is about 3, electric breakdown strengths are about identical at 100 V/micron, and solubility in both hot and cold solvents are below detectable levels.

In this reaction it is believed that the reactive p-xylylene reactive intermediate is formed and subsequently dimerized in the reaction tube 235 or during condensation 245 onto the substrate 250. This reaction used to synthesize the dimer, in comparison with the known "Gorham process", results in a vast improvement in the overall synthesis yield of the dimer and also results in a vast improvement in the purity of the dimer directly from the reaction. It is understood that variation in the stoichiometric amounts of the reactants may be adjusted to provide for greater or lesser yield with associated purities varying to provide a more economical process or better overall production efficiency without substantially deviating from the scope of this invention. Subsequent purifications of the materials from this reaction can be performed on this material in a manner that is much easier to accomplish than with previously taught processes. The reaction is shown below.

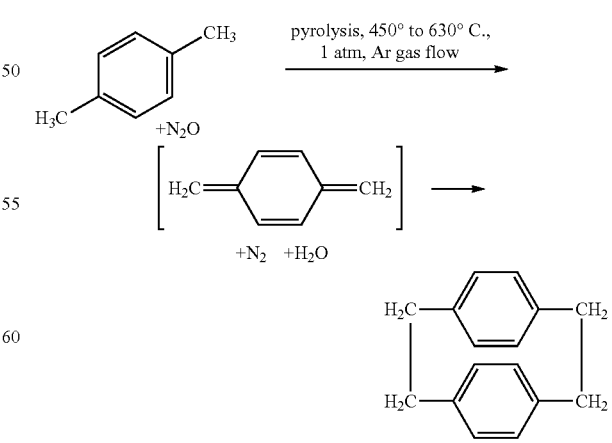

As the reaction temperature at station 235 is increased to >650° C., the deposition of the xylylene monomer can proceed directly onto a solid substrate target without necessity for isolating the intermediate dimer. Deposition of the exit gas at above 650° C. reaction temperature upon a cool glass plate resulted in formation of an ethanol insoluble substance that displays characteristics of a parylene polymer. However, solubility characteristics clearly show that the material is insoluble in all common solvents (i.e. hexane, xylene, ethyl acetate, ethanol, water).

It is believed that the reaction mechanism proceeds through a route involving the prior decomposition of nitrous oxide. Nitrous oxide is energetically unstable molecule that can be thermally decomposed at elevated temperatures. Products of the reaction are diatomic nitrogen and monoatomic oxygen. The monoatomic oxygen is able to react with itself to form diatomic oxygen, but this reaction is relatively slow. Estimates vary determining the temperature that pure thermal decomposition occurs, but estimates of 1100° C. are often cited. Catalysis of this reaction as shown below in equation 1 is known to occur with a variety of metal oxides and mixed metal oxides. Some temperatures used for nitrous oxide decomposition with certain catalysts are as low as 350° C.

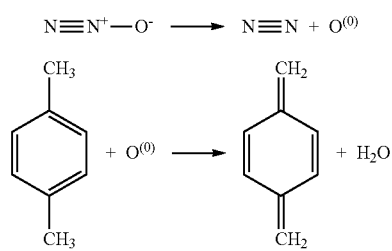

Equation 1

Equation 2

The reactive species for the process is very likely the monoatomic oxygen produced from the decomposition of the nitrous oxide. In this sense, the nitrous oxide can be viewed as a convenient carrier for the delivery of the reactive intermediate monoatomic oxygen.

In a similar manner to the nitrous oxide reaction, pure diatomic oxygen can be utilized as a reactant. However, to produce substantial yields of the desired products, activation of the oxygen is necessary. It is believed that activation of the oxygen is due to the excitation of the oxygen molecule to produce monoatomic oxygen as shown in Equation 3.

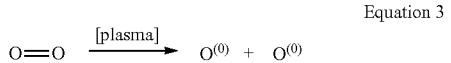

Equation 3

The reaction with monoatomic oxygen produced in this manner thus proceeds in a manner similar to that of the nitrous oxide decomposition route.

Cooling of the elevated temperature gases 245 exiting from the reaction tube 235 is necessary. If the reaction gas is at too high of a temperature, the ability of the reactive intermediate to condense and adhere to a surface is greatly reduced. To this end, a device to mix cool nonreactive gases into the hot reaction stream has been devised. The reaction may proceed at increased pressure (above atmospheric pressure). Accordingly, an expansion valve may be used at the exit of the reaction tube 235 to provide Joule-Thomson effect cooling of the hot gas when the gas is below its inversion temperature.

The method may be extended to other substrates such as the ones shown below.

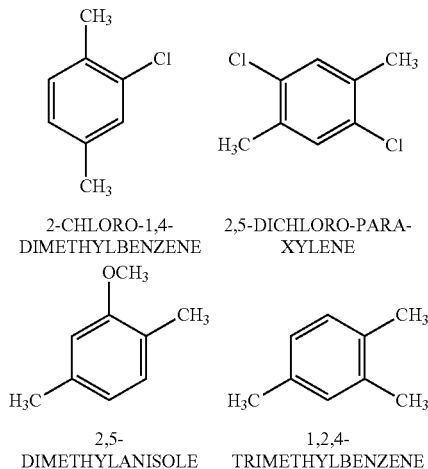

Substituents such as the ones noted above (chloro, dichloro, methoxy, and methyl) are not the only aromatic substituents that are capable of being modified by this process into reactive intermediates and their subsequent polymers. Additionally, paracyclophanes and compounds derived thereof are not exclusive to this process. Meta and ortho orientation of the substituents on the aromatic rings are also viable reaction starting materials. The reaction can be generalized to include all compounds that are capable of reaction with monatomic oxygen produced from a plasma or from decomposed nitrous oxide or its intermediate reaction products and also contain hydrogen atoms stabilized by the presence of an aromatic ring. Typically such hydrogen atoms are located in a position alpha to a phenyl ring (benzylic position). Michael structures removed from the alpha aromatic ring positions are known to give similar reactivity to the hydrogen alpha to the aromatic ring position as is well known to those versed in organic synthesis. However, the reactivity of such hydrogen atoms is not limited to alpha and/or Michael positions from an aromatic ring or the aromatic ring such as benzene. Other aromatic stabilization are known for many different rings, fused rings, and non-ring systems, as known to those versed in the art of organic chemistry. Such starting materials may preferably have the presence of two hydrogen atoms that are capable of being removed to form partially oxidized starting materials. These preferred materials may optionally have the ability to dimerize, trimerize, oligomerize, or polymerize. The non-limiting example used herein is p-xylene.

A preferred implementation of the invention augments permittivity of the polymer by exposing the condensing reaction products 245 to a magnetic or electric field. To the output of the reactions described above, the gaseous stream of reaction product 245 is directed to a cool solid surface 250. Illustratively, the surface target 250 may be immersed in a magnetic field 255 such as that provided by a Neodymium magnet (S84, K&J Magnetics). Other magnetic field sources may be utilized and are intended to come within the scope of the invention. Condensation of the monomer and subsequent polymerization can proceed rapidly while in the magnetic field 255. If the target and the magnet maintain the same relative orientation during the polymerization process, then a baseline increase in the electrical permittivity will occur. If the orientation of the magnetic field 255 relationship to the target is rotated during the polymerization or solid phase condensation process, then the resulting permittivity will be decreased.

When the reaction is conducted as noted above, using the p-xylylene monomer as the polymerization molecule, but without the presence of the magnetic field the relative permittivity of the material deposited is approximately 3. When the material is run as described with a magnetic flux 255 density of approximately 200 to 2000 Gauss, the relative permittivity is approximately 7. Thus, the magnetic field substantially increases the permittivity by over a factor of 2 times. In a similar manner other salts, dipoles, and salts of organic acids can be entropically oriented during solidification or polymerizations to produce enhanced high permittivity materials. Improvements in permittivity range from 10 to over 1000% may be attained.

In another implementation, the surface target 250 is immersed in an electric field 255 such as that provided by a high voltage power supply (G40, Emco, lead spacing 2" at 4000V). Condensation of the monomer and subsequent polymerization can proceed rapidly while in the electric field. If the target and the electric field maintain the same relative orientation during the polymerization process, then a baseline increase in the electrical permittivity will occur. If the orientation of the electric field relationship to the target is rotated during the polymerization or solid phase condensation process, then the resulting permittivity will be lower.

Condensation of dielectric reaction products in the presence of an electric and/or magnetic field, augments the permittivity of the condensed dielectric. This step may be applied to compounds other than parylene polymers.

When the condensation step is conducted as noted above, using maleic acid salt with guanidine as a high dielectric material, but without the presence of the electric field the relative permittivity of the material deposited is approximately 500. When the material is run as described with an electric field density of 10,000 to 30,000 V/m, the relative permittivity is approximately 25000 to 40000. Thus, the electric field substantially increases the permittivity by at least a factor of 25 in that particular case. In a similar manner other salts, dipoles, and salts of organic acids can be entropically oriented during solidification or polymerizations to produce enhanced high permittivity materials. Improvements in permittivity range from 50 to over 10000%.

The use of electrical and/or magnetic fields during the condensation process modifies the mechanical strength. The material may not be anisotropic after condensation in strong fields. Thus, this method is a way of controlling the mechanical properties of the reaction products made by this procedure.

Figure 4:
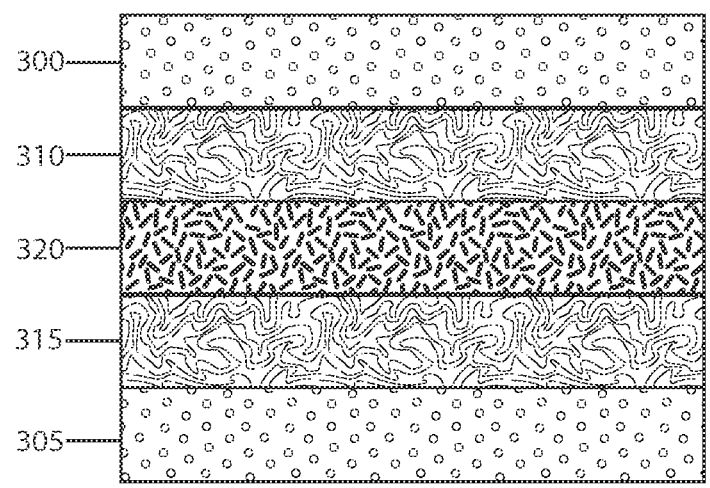
FIG. 4 is a schematic that conceptually illustrates an exemplary structure comprising layers of materials for a capacitor according to principles of the invention.

Referring now to FIG. 4, an exemplary capacitor structure according to principles of the invention is conceptually illustrated. A removable carrier film 325 (e.g., a polymer film such as TFE or other non-stick surface material as generally known) is used as an initial substrate upon which a conductive coating 305 is deposited. This layer 305 is the first electrode. The coating 305 may be aluminum or other conductive metal or possibly a carbon coating or conductive polymer. Next, a thin coating of a high permittivity dielectric material 315, such as a Puralene polymer with augmented permittivity, is applied to the conductive coating 305 to provide a nonconductive surface 315 while the conductive coating 305 retains its conductivity in the two dimensions perpendicular to the coating plane. Subsequent to this step, a thick film of dielectric material 320 may then be applied to this surface 315 by any of a variety of methods known to those in the thick film coatings (e.g., screen coating, spin coating, vapor deposition, etc.) Optionally, then another thin coating of a high permittivity dielectric material 310, such as a Puralene polymer with augmented permittivity, is applied to the surface of this dielectric thick film 320. Finally, the exposed surface of the layers is coated or put in contact with another conductive layer 300 to form an opposite electrode from the first 305. Advantageously, the intermediate thin film dielectric layers 310, 315 substantially enhance overall permittivity in a cost effective manner, without compromising break-down E-field or increasing leakage current at maximum voltage charge. Connection and mounting of the device thus constructed is well known to those versed in this art.

An ionization process may be utilized to enable the dielectric 310, 315 to be applied as a thin film. An ionizing gas may be fed into a vapor (or atomized) material. The resulting material is electrically or magnetically augmented and directed to a removable carrier film, as described above. The carrier film has a conductive surface that is oppositely charged from the charge of the ionized dielectric. This surface then attracts the dielectric material 310, 315 to provide a smooth and uniform surface onto which the dielectric may condense. The dielectric 310, 315 is condensed in the presence of an electric and/or magnetic field onto the conductive surface. After the dielectric 310, 315 is so formed, it may be applied as a layer of a capacitor and the carrier film may be removed.

In another embodiment, the dielectric coating 310, 315 is applied by means of an ionization process as a thin film. In this embodiment, an ionizing gas is fed into a vapor (or atomized) material. The resulting material is electrically charged and directed to the carrier film. The carrier film has a conductive surface that is oppositely charged from the charge of the ionized dielectric. This surface then attracts the dielectric material to provide a smooth and uniform surface for the dielectric to condense. In this case the dielectric is condensed in the presence of an electric field onto the conductive surface. Additionally, the film surface is immersed in a magnetic field provided by a flowing electric current or a permanent magnet during the condensation or liquid spreading phase. After the dielectric 310, 315 is so formed, it may be applied as a layer of a capacitor and the carrier film may be removed.

Figure 5:
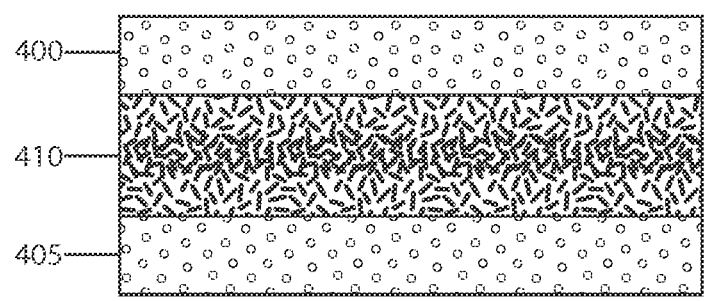
FIG. 5 is a schematic that conceptually illustrates another exemplary structure comprising layers of materials for a capacitor according to principles of the invention.

In yet another embodiment, each dielectric layer 310, 315 is applied, by means of an ionization process, as a thin film. In this embodiment the coating is applied is applied in a continuous fashion with a gradient of composition such that first a low permittivity material is applied, then a changing composition to a higher permittivity material is sequentially deposited, as conceptually illustrated in FIG. 5. The composition of the dielectric layer 410, once it reaches a certain thickness, may then have a constantly decreasing permittivity by incorporation of different layers or stepless gradient methods of deposition in liquid or vapor phase, e.g., CVD. This dielectric layer 410 is nonhomogeneous, having a permittivity gradient with permittivity being less at the dielectric-electrode interfaces 400-410, 405-410, than at the center of the dielectric 410. The dielectric 410 is disposed between electrodes 400, 405.

These methods of electrostatic capacitor manufacture are different from prior art methods and produce a structurally and functionally distinct capacitor.

The principles of the invention may be applied to film capacitors. A conventional film capacitor, which has a single layer of polymer film, exhibits the best dissipation factors and the best power delivery capabilities. Limited energy densities of film capacitors reduce their applications. With the methods described above, the limitation of energy density in the film capacitor can be substantially removed.

An insulative polymer layer 310, 315 next to the electrode 300, 305 is optional. In certain cases it is best to coat both electrodes with a coating that is thinner than would be otherwise used. This reduces the probability of a pore causing a leakage current. In addition, it may also be advantageous to the nature of the dielectric to apply an insulative layer within the bulk dielectric. This provides for better bonding and less stress when flexing the layers during handling due to the more flexible nature of the high permittivity materials in contact with the electrodes.

When a polymer for forming a SHED dielectric is chosen, a particularly excellent choice is a polymers from the parylene (poly-p-xylylene) family of polymers, which may be formed as Puralene using the method described above in relation to FIG. 3. Puralene polymer provide several advantages including 1) decreased number and size of pores, 2) low cost, 3) freedom from defects with self-healing properties, 4) ease of use and low cost of application, and 5) ability to have custom modifications of chemical and morphological structure. As a very cost effective choice Puralene is a preferred polymer for a capacitor according to principles of the invention. However, other methods for forming pore-free coatings are known and can used in the manner described herein. Thus, the invention is not limited to the Puralene family of polymers and related derivative structures.

As can be seen from the foregoing description, the present method avoids the high temperature methods greater than 500° C. at the dielectric formation site. This allows for the use of lower temperature polymers such as organic polymers. In addition, the high permittivity dielectric may be used in conjunction with other high dielectric materials that normally would be unsuitable as capacitor dielectrics.

A capacitor according to principles of the invention controls leakage current. The coating material coats and insulates, including contaminants. This enables manufacture of the device with fewer defects and with better production yields. Since it is difficult to make most high permittivity dielectrics pure enough to display low conductivity (and thus producing high leakage currents), the use of organic polymers produced directly on the electrodes is superior to conventional polymers and dielectrics commonly found in electrostatic capacitors.

The formation of the enhanced dielectric material in the presence of an electric field is believed to be a result of the orientation of the electrostatic charges and dipoles that are in the resulting mixed matrix of dielectric. The field causes an ordering of the polymer or the solid matrix in a largely entropically more ordered arrangement at a higher energy. This, in and of itself, does not cause an increase in permittivity, but it does allow for the less polar portions of the dielectric to assume different energetically favored arrangements within the solid matrix in the presence of an electric field than in the absence of the field. In the absence of the ordering effect in the solid dielectric, the total energy difference in conformational changes that take place with the electric field versus the total energy in the absence of the field are smaller. This arrangement is referred to herein as an "electric field ordered solid matrix," which appreciably augments permittivity. A polymer having an electric field ordered solid matrix exhibits an augmented permittivity.

It would be understandable if the sensitivity of the solid dielectric to magnetic field effects during the solidification process for the polymer or other solidification process showed little effect. This is not the case, however. During any chemical reaction process there is a certain amount of radical character. It is believed that induced free electron radicals modify the course of the solidification process during the chemical reaction due to its interaction with the magnetic field during certain transition states and/or radical intermediate species and induced changes to the overall permittivity of the resultant polymer or other chemical species. In the case of the methods for the formation of high permittivity materials, this effect has been found to be profound to the overall performance of the energy storage device. This type of substance is referred to as having "radical intermediate species" induced by a magnetic field, which augments permittivity. A polymer having a magnetic field induced radical intermediate specie, exhibits an augmented permittivity.

The methods described herein provide a unique approach for making high permittivity capacitors without having to resort to standard high temperature manufacturing methods that almost no organic compound can withstand. This new approach vastly expands the materials by which these capacitors can be made, and increases the performance of the capacitors due to the reduced leakage currents that many organic polymers can display. Additionally, these materials may be manufactured in a manner to form large area films with enhanced dielectric properties.

One method for the manufacture of a SHED capacitor according to principles of the invention is to use a PET film as a carrier film (such as 0.5 to 6 inches in width), and deposit the layers as noted above on a roll to roll machine. Methods to deposit the dielectric materials are known to those versed in the art of film deposition. Typically a 10 micron thick coating of the dielectric may be deposited by vapor phase evaporation and the electrodes may be 0.5 microns in thickness. This coated film can be rolled into a cylinder and edge connection attached as known to those in this area of production.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A solid state electrical energy state storage device comprising:
   a pair of conductive electrodes, including a first electrode and a second electrode, the first electrode and second electrode being parallel and spaced apart by an intervening space; and a primary dielectric comprised of a primary dielectric material, being disposed between the pair of conductive electrodes within the intervening space, and having a first surface adjacent to the first electrode and an opposite second surface adjacent to the second electrode; and a secondary dielectric layer comprised of a secondary dielectric material, being disposed between and in contact with the first surface of the primary dielectric and the first electrode, the secondary dielectric layer having an augmented permittivity, which is permittivity that is augmented by exposing the secondary dielectric material, or a precursor thereof, to a magnetic field, an electric field, or both during formation of the secondary dielectric material before the secondary dielectric material has fully solidified.

2. The solid state electrical energy state storage device according to claim 1, further comprising:

a tertiary dielectric layer comprised of a tertiary dielectric material, being disposed between and in contact with the second surface of the primary dielectric and the second electrode, the tertiary dielectric layer having an augmented permittivity, which is permittivity that is augmented by exposing the tertiary dielectric material, or a precursor thereof, to a magnetic field, an electric field, or both during formation of the tertiary dielectric material before the tertiary dielectric material has fully solidified.

3. The solid state electrical energy state storage device according to claim 2, wherein the secondary dielectric material is different from the primary dielectric material.

4. The solid state electrical energy state storage device according to claim 3, wherein the secondary dielectric material is the same as the tertiary dielectric material.

5. The solid state electrical energy state storage device according to claim 4, wherein the primary dielectric layer has a primary thickness, the secondary dielectric layer has a secondary thickness, and the tertiary dielectric layer has a tertiary thickness, and the secondary thickness being about the same as the tertiary thickness and being substantially less than the primary thickness.

6. The solid state electrical energy state storage device according to claim 5, wherein the secondary dielectric layer comprises an insulating polymer.

7. The solid state electrical energy state storage device according to claim 6, wherein the insulating polymer comprises a xylene based polymer.

8. The solid state electrical energy state storage device according to claim 7, wherein the xylene based polymer is a puralene polymer.

9. The solid state electrical energy state storage device according to claim 6, wherein the insulating polymer is an organic polymer material capable of having an electric field ordered solid matrix.

10. The solid state electrical energy state storage device according to claim 6, wherein the insulating polymer has a magnetic field induced radical intermediate species.

11. The solid state electrical energy state storage device according to claim 9, wherein the insulating polymer has a magnetic field induced radical intermediate species.

12. The solid state electrical energy state storage device according to claim 9, wherein the insulating polymer has a magnetic field augmented permittivity.

13. The solid state electrical energy state storage device according to claim 9, wherein the insulating polymer has an electric field augmented permittivity.

14. The solid state electrical energy state storage device according to claim 10, wherein the insulating polymer has a magnetic field augmented permittivity.

15. The solid state electrical energy state storage device according to claim 10, wherein the insulating polymer has an electric field augmented permittivity.

16. A solid state electrical energy state storage device comprising:

a pair of conductive electrodes, including a first electrode and a second electrode, the first electrode and second electrode being parallel and spaced apart by an intervening space; and a primary dielectric comprised of a primary dielectric material, being disposed between the pair of conductive electrodes within the intervening space, and having a first surface adjacent to the first electrode and an opposite second surface adjacent to the second electrode; and a secondary dielectric layer comprised of a secondary dielectric material comprising a puralene polymer, being disposed between and in contact with the first surface of the primary dielectric and the first electrode, the secondary dielectric layer having an augmented permittivity, which is permittivity that is augmented by exposing the secondary dielectric material, or a precursor thereof, to a magnetic field, an electric field, or both during formation of the secondary dielectric material before the secondary dielectric material has fully solidified.

* * * * *